Feb. 24, 1942.  W. A. VAN BERKEL  2,274,627
SLICING MACHINE
Filed March 10, 1939

INVENTOR.
WILHELMUS ADRIANUS VAN BERKEL
BY: Cox & Moore
ATTORNEYS.

Patented Feb. 24, 1942

2,274,627

UNITED STATES PATENT OFFICE 2,274,627

SLICING MACHINE

Wilhelmus Adrianus van Berkel, Clarens, Montreux, Switzerland, assignor to U. S. Slicing Machine Company, La Porte, Ind., a corporation of Indiana Application March 10, 1939, Serial No. 261,127
In the Netherlands March 12, 1938

2 Claims. (Class 146—94)

This invention relates to slicing machines in general and particularly to slicing machines of the so-called semi-electric, pull-push type having an electrically driven knife and a manually operated carriage.

An important object of the present invention is the provision of a semi-electric slicing machine having a new and improved slice conveyor which is controlled by the manual operation of the carriage but which operates disproportionately with respect to the movement of the carriage.

Another object of the invention is the provision of a slice conveyor which is operated by new and improved means cooperating with and controlled by the movement of the carriage to convey a slice from cut position to discharge position regardless of the distance the carriage is operated, providing, however, that the carriage is operated a distance sufficient to have a slice severed from the substance.

A further object of the invention is the provision of a slice conveyor cooperating with a discharge fly, there being means controlled by the operation of the carriage to operate the conveyor so that the conveyor will either be in slice-receiving or slice-discharging position with respect to the slicing stroke of the carriage regardless of whether or not a large or small slice is being cut and regardless of the distance the carriage travels, just so the carriage travels a sufficient distance to completely cause a slice to be severed by the knife.

Numerous other objects and advantages will be apparent throughout the course and progress of the following specification.

The accompanying drawing illustrates selected embodiments of the invention and the views therein are as follows.

Figure 1:
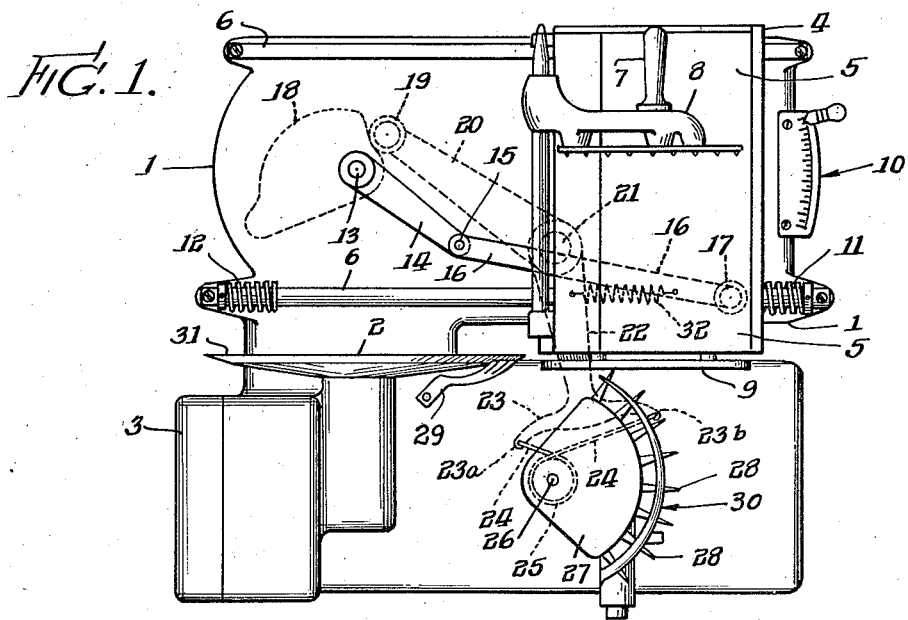
Fig. 1 is a diagrammatic or schematic plan view of a slicing machine and embodying the invention.

The particular slicing machine herein disclosed for the purpose of illustrating the invention comprises a base or frame 1 upon which there is operatively mounted a circular, rotatable knife 2 driven through any operative means by an electric motor 3. A carriage 4, having a substance table 5, is slidable manually to and fro toward and away from the knife 2. The carriage is mounted for slidable movement on guides 6, there being a handle 7 mounted on a pusher 8 to permit slidable movement of the carriage. The pusher 8 is adapted to move substance on the table 5 against a gauge plate 9. The gauge plate 9 is provided with an adjusting mechanism 10 so that the gauge plate 9 may be moved toward and away from the cutting plane so as to determine the thickness of a slice to be cut. Resilient stops 11 and 12 are positioned at the ends of the guide rods 6 to limit the extreme positions of the carriage 4. A vertical shaft 13 is mounted in the machine frame or base 1, and this shaft 13 has a crank arm 14 mounted thereon. The free end of the crank arm 14 is pivotally connected at 15 to a rod 16, the rod being also pivotally connected at 17 to the carriage 4.

The extreme positions of the crank 14, considered in the direction of movement of the carriage, are located within an angle of 180 degrees so as to eliminate all troublesome dead center positions. A cam disk 18 is secured to the shaft 13 and a roller 19 is adapted to engage the cam 18. The roller 19 is mounted on an arm 20 of a bell crank lever which is rotatable or pivotally mounted upon a part of the frame as indicated at 21. The other arm 22 of the bell crank lever terminates in a fork 23 having forked ends 23a and 23b. A belt 24 is looped about a disk 25 mounted on a vertical shaft 26, the ends of the belt being attached to the forked ends 23a and 23b. The shaft 26 is suitably mounted and supported in a part of the machine frame or base and carries a slice conveyor 27, which in plan view and in cross section is sector shaped. This conveyor 27 is provided with a superposed series of slice-receiving needles or prongs 28, which are adapted to engage and impale a slice being cut from the substance by the knife 2. A slice deflector 29 deflects a slice as it is being cut by the knife 2 into position to be engaged by the prongs on the conveyor and assists in pushing the slice well on the needles 28 so that the slice will be properly impaled. A discharge fly 30 is provided for discharging slices which are impaled on the prongs of the conveyor. The knife 2, which is preferably of the concave type, is provided with a plate 31 to prevent the substance from being pressed into the knife cavity.

In Fig. 1 the conveyor is shown as occupying a correct deflecting position, with the roller 19 located in front of a steep portion of the circumference of the cam so that when the carriage 4 is moved towards the knife the conveyor will be rapidly swung into receiving position and will occupy the correct receiving position at the required moment. Thereupon the carriage and the conveyor will move in synchronism during the picking up of the slice. Upon the return movement of the carriage the conveyor will also reach in time the correct deflecting position. The conveyor 27 is operated by the bell crank, which in turn is operated by the disk or cam 18. The roller 19 is kept into engagement with the cam disk 18 by a spring 32, which has one of its ends attached to the arm 22 of the bell crank lever and its other end attached to a part of the frame. The operation of the conveyor, therefore, is in proper timed relationship with the movement of the carriage so that the impaling position of the conveyor will be at its proper position with respect to the position of the carriage during the slicing stroke. Also the discharge position of the slice conveyor will be at the proper position with respect to the return stroke of the carriage.

Figure 2:
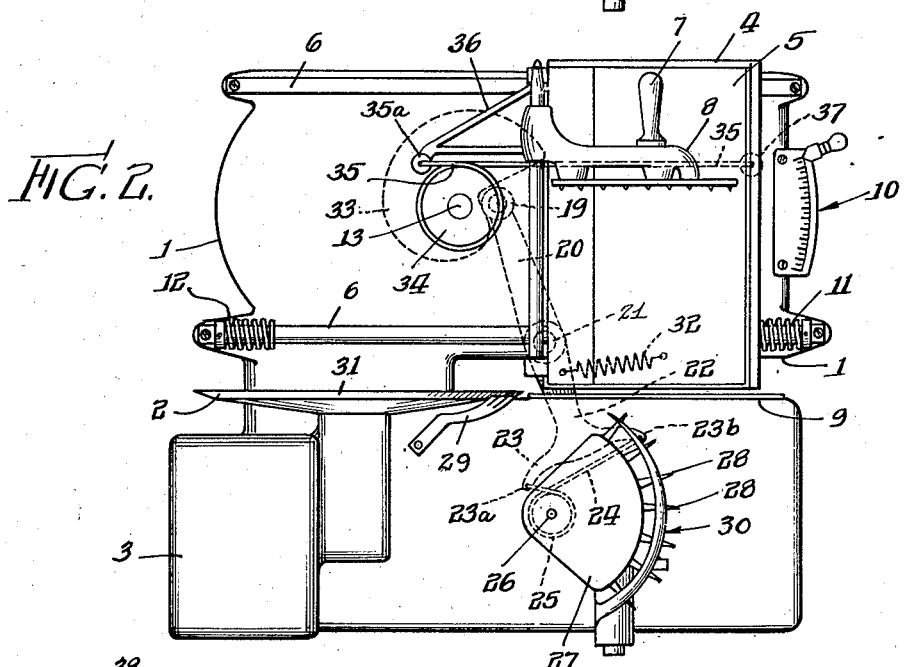
Fig. 2 is a view similar to Fig. 1 disclosing a modified arrangement for operating the slice conveyor.

The slicing machine shown in Fig. 2 employs a slightly different crank and connecting rod mechanism from that shown in Fig. 1 in that the bell crank has its arms 20 and 22 in a relatively straight line. A disk 34 is secured to the shaft 13 of a cam disk 33, and a belt 35 is looped around the disk 34. One end of the belt 35 is fixed as at 35a to a bracket 36, which is rigid with a part of the carriage 4. The other end of the belt 35 is connected to a part of the carriage as indicated at 37. The cam disk 33 cooperates with the roller 19 on the arm 20 of the bell crank in the same manner as previously described in connection with Fig. 1. The operation of the conveyor 27 is exactly the same as previously described.

Figure 3:
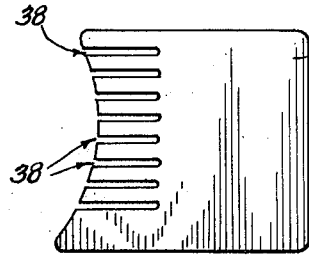
Fig. 3 is a detail elevational view of a slice thickness control plate, commonly called a gauge plate.

The gauge plate 9, Fig. 3, is provided with slots 38, which are open in the direction of the knife and permit the needles or prongs 28 of the conveyor to pass therethrough.

If a carriage occupying an inclined position is used, the substance may be fed under the action of gravity or of its own weight instead of being fed by the pusher plate 8, and while the pusher plate herein shown is adapted to be manually operated, it is of course understood that it may be spring pressed so that it will continuously urge the substance towards the gauge plate.

If desired, the slice conveyor 27 may be mounted so as to pivot about an axis located outside of the conveyor shaft instead of in the manner in which it is shown.

The shaft 13 may be extended downwardly in the frame or one or more cams or disks may be mounted separately on the shaft 13. In Fig. 2, the disk 34 may be made integral with the cam 33 or they may be made as separate units and operatively attached to the shaft 13.

The invention provides a slicing machine having an oscillatory conveyor which is controlled and operated by a manually movable carriage.

The operation of the slice conveyor with respect to the operation of the carriage is such as to be disproportional, whereby a relatively small stroke of the carriage will still bring the conveyor into correct receiving and deflecting position.

Changes may be made in the form, construction and arrangement of the parts without departing from the spirit of the invention or sacrificing any of its advantages, and the right is hereby reserved to make all such changes as fairly fall within the scope of the following claims.

The invention is hereby claimed as follows:

1. A slicing machine of the character described comprising a rotary slicing knife, a substance carriage reciprocable past said knife, a gauge plate extending in a plane substantially parallel with the plane of said knife and closely approaching the cutting edge of said knife, a rotary conveyor for receiving slices cut by said knife and moving the cut slices to a discharge position, and slice impaling prongs on said conveyor adapted to closely approach said cutting edge of the knife and extend into the plane of said gauge plate upon operation of the conveyor, said gauge plate being provided with slots arranged in said plane substantially parallel with the plane of the knife and providing spaces through which said prongs are adapted to pass upon operation of the conveyor and providing for adjustment of the gauge plate to vary the thickness of slice.

2. A slicing machine of the manually operable push-pull type comprising a slicing knife, a substance carriage reciprocal to a variable extent past said knife by pushing and pulling the carriage by hand, means for feeding predetermined thicknesses of slice for cutting by said knife, a rotatably mounted conveyor having slice-taking elements movable between a slice-taking zone and a discharge position, and drive means for positively moving said conveyor to said slice-taking zone and to said discharge position irrespective of variable movement of the carriage including a cam mounted for oscillatory movement, a driving surface on said cam so shaped as to provide for operating said conveyor at different speeds relative to the speed of movement of said carriage to move the conveyor at an accelerated speed with respect to carriage movement during travel of the conveyor towards said slice-taking zone, to move the conveyor at substantially the same linear speed as the carriage during movement in the slice-taking zone, and to move the conveyor at an accelerated speed with respect to carriage movement during return travel of the conveyor to said discharge position, means operated by said cam surface and drivingly connected to said conveyor for operating the conveyor, and means drivingly interconnecting said cam and said carriage to effect correlated oscillatory movement of the cam by reciprocating movement of the carriage.

WILHELMUS ADRIANUS van BERKEL.